(12) United States Patent
Lewkow et al.

(10) Patent No.: US 9,979,906 B2
(45) Date of Patent: May 22, 2018

(54) BEAM SPLIT EXTENDED DYNAMIC RANGE IMAGE CAPTURE SYSTEM

(71) Applicant: Waymo LLC, Mountain View, CA (US)

(72) Inventors: Roman Lewkow, San Jose, CA (US); Mark Shand, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 0 days. days.

(21) Appl. No.: 15/227,113

(22) Filed: Aug. 3, 2016

(65) Prior Publication Data

US 2018/0041721 A1 Feb. 8, 2018

(51) Int. Cl.
*H04N 5/355* (2011.01)
*G02B 27/10* (2006.01)
*H04N 9/04* (2006.01)

(52) U.S. Cl.
CPC ......... *H04N 5/355* (2013.01); *G02B 27/1013* (2013.01); *H04N 9/045* (2013.01)

(58) Field of Classification Search
CPC ...... H04N 5/355; H04N 9/045; H04N 5/2258; H04N 2209/048; H04N 2209/049; H04N 5/247; H04N 9/09; H04N 9/093; H04N 9/097; H04N 3/1593; H04N 1/486; H04N 1/488; G02B 27/1013
See application file for complete search history.

(56) References Cited

U.S. PATENT DOCUMENTS

| | | | |
|---|---|---|---|
| 6,529,640 B1 * | 3/2003 | Utagawa | H04N 5/2355 348/234 |
| 6,801,719 B1 | 10/2004 | Szajewski et al. | |
| 8,439,265 B2 | 5/2013 | Ferren et al. | |
| 9,258,468 B2 | 2/2016 | Cotton et al. | |
| 2003/0048493 A1 | 3/2003 | Pontifex et al. | |
| 2006/0061680 A1 | 3/2006 | Madhavan et al. | |
| 2006/0119710 A1 * | 6/2006 | Ben-Ezra | H04N 5/23248 348/208.99 |

(Continued)

FOREIGN PATENT DOCUMENTS

WO 2013/076531 5/2013

OTHER PUBLICATIONS

Written Opinion, International Application No. PCT/US2017/043934, dated Oct. 20, 2017.

*Primary Examiner* — Jason A Flohre
(74) *Attorney, Agent, or Firm* — McDonnell Boehnen Hulbert & Berghoff LLP (57) ABSTRACT

An optical system and method may relate to capturing extended dynamic range images. In an example embodiment, the optical system may include a lens element configured to receive incident light and a beam splitter optically coupled to the lens element. The beam splitter is configured to separate the incident light into at least a first portion having a first photon flux and a second portion having a second photon flux. The first photon flux is at least an order of magnitude greater than the second photon flux. A controller may be configured to cause a first image sensor to capture a first image of the first portion of the incident light according to first exposure parameters and cause a second image sensor to capture a second image of the second portion of the incident light according to second exposure parameters.

19 Claims, 7 Drawing Sheets

(56) References Cited

U.S. PATENT DOCUMENTS

| | | | |
|---|---|---|---|
| 2006/0291849 A1* | 12/2006 | Shamir | H04N 5/235 |
| | | | 396/334 |
| 2007/0278386 A1* | 12/2007 | Paxman | H04N 5/3572 |
| | | | 250/208.1 |
| 2009/0231465 A1* | 9/2009 | Senba | H04N 5/23248 |
| | | | 348/229.1 |
| 2009/0244717 A1* | 10/2009 | Tocci | H04N 5/2355 |
| | | | 359/636 |
| 2012/0257070 A1* | 10/2012 | Grossetete | H04N 5/235 |
| | | | 348/218.1 |
| 2015/0029361 A1 | 1/2015 | Wagner | |
| 2015/0172608 A1* | 6/2015 | Routhier | H04N 5/2258 |
| | | | 348/265 |
| 2016/0182839 A1* | 6/2016 | Shigeta | H04N 5/35581 |
| | | | 348/362 |

* cited by examiner

Cross Sectional View

BEAM SPLIT EXTENDED DYNAMIC RANGE IMAGE CAPTURE SYSTEM

BACKGROUND

Conventional three-chip cameras may include one or more beam splitters to separate colors into rough visible light color ranges (e.g., red, green, blue). For a normal scene, the expected photon flux in each of these color ranges may be substantially balanced to equalize the signal/noise ratios in all image sensors.

SUMMARY

An optical system and method may capture an extended- or high-dynamic range image by attenuating incident light going to one or more of a plurality of image sensors in order to capture a portion of the dynamic range of light intensities that would normally over-expose sections of the image sensor. As such, the optical system and a method may relate to high-dynamic range imaging. According to an example embodiment, an optical system may include one or more beam splitters configured to separate incident light into at least two portions. The portions of light may be at least an order of magnitude (10×) different in photon flux. For example, a first portion of light may include one hundred times the photon flux of a second portion of light. In some embodiments, further beam splitters may separate the incident light into further portions of light.

In an aspect, an optical system is provided. The optical system includes at least one lens element configured to receive incident light. The optical system also includes at least one beam splitter optically coupled to the at least one lens element. The at least one beam splitter is configured to separate the incident light into at least a first portion having a first photon flux and a second portion having a second photon flux. The first photon flux is at least an order of magnitude greater than the second photon flux. The optical system also includes a first image sensor configured to receive the first portion of the incident light and a second image sensor configured to receive the second portion of the incident light. The optical system yet further includes a controller having at least one processor and a memory. The controller is configured to execute instructions stored in the memory so as to carry out operations. The operations include causing the first image sensor to capture a first image of the first portion of the incident light according to first exposure parameters and causing the second image sensor to capture a second image of the second portion of the incident light according to second exposure parameters.

In an aspect, a method is provided. The method includes receiving incident light via at least one lens element and separating, by at least one beam splitter, the incident light into at least a first portion having a first photon flux and a second portion having a second photon flux. The first photon flux is at least an order of magnitude greater than the second photon flux. The method also includes causing a first image sensor to capture a first image of the first portion of the incident light according to first exposure parameters and causing a second image sensor to capture a second image of the second portion of the incident light according to second exposure parameters.

In an aspect, a system is provided. The system includes various means for carrying out the operations of the other respective aspects described herein.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

A field of view of an optical system may include portions of a scene with widely varying photon fluxes. That is, a given scene may include both very bright features and very dim features. Additionally or alternatively, some features of a scene may emit light in a periodic and/or changing manner (e.g., strobing, dimming, etc.). Due to the relatively limited dynamic range of conventional image sensors, some image information may need to be "thrown away" for a given exposure condition. For instance, in an effort to best capture the "highlights" or very bright parts of a given scene, an exposure condition of an optical system may include a small aperture setting, a low gain/low sensitivity image sensor setting, and/or a relatively short exposure time. In such a scenario, bright portions of the scene may be captured accurately. However, dim portions of the scene may be captured as "black" because, for the particular exposure condition, the photon flux from such regions of the scene may be too small to fall within a given image sensor's dynamic range (e.g., photon flux is below a noise level of the image sensor).

Similarly, in an effort to capture the "shadows" of a given scene, an exposure condition of the optical system may include a large aperture setting, a high gain/high sensitivity image sensor setting, and/or a relatively long exposure time. As such, the dim portions of the scene may be captured accurately. However, the bright portions of the scene may be "blown out" due to saturation as the image sensor may have received more photons from such regions than the image sensor's dynamic range could reproduce.

An optical system and a method described herein may provide high-dynamic range image capture. Namely, according to an example embodiment, an optical system may include one or more beam splitters configured to separate incident light into at least two portions. The different portions of light may be at least an order of magnitude (10×) different in photon flux. For example, a first portion of light may include one hundred times the photon flux of a second portion of light. In some embodiments, further beam splitters may separate the incident light into further portions of light.

The respective portions of incident light may be received and captured by respective image sensors. Each of the image sensors may be operated separately from the others. Specifically, each image sensor may be configured to capture the respective portions of light via different image capture exposure parameters. For example, in the scenario described above, the first portion of light may be captured with an exposure time of 1 ms while the second portion of light may be captured with an exposure time of 100 ms. In an example embodiment, the optical system may include the same field of view for each image sensor. As such, optical system complications, such as parallax, may be eliminated. In an example embodiment, both image captures may take place within the same time interval (exposure window). As such, temporal mismatch between the two images may be eliminated to simplify the task of combining two images into one, high dynamic range, image.

Additionally, other optical elements may be included that are configured to alter the characteristics of one or more portions of the incident light. For example, the other optical elements may include optical attenuators, spatial filters, or lenses.

In some embodiments, the image sensors may be of the color-mosaic type, or one or more of the image sensors may have different characteristics than other image sensors of the system. For instance, one or more sensors may be monochrome while other sensors are color, etc. Furthermore, one or more of the sensors may have different spectral response, different spatial resolution, or different readout rates than the other sensors. Operation of all image sensors with the same parameters is also possible.

In an automotive context of detecting traffic lights and vehicular indicators (e.g. brake lights or turn signal lights), various exposure parameters may be fixed and/or known ahead of time. As such, an example embodiment may be designed based on a known optical flux. That is, an exposure time may be provided that covers most of the frame time (e.g., of a known traffic light raster period) to maximize sensor duty cycle and minimize a risk that the illumination of the light source will fall outside the photon capture interval. In other words, one of the image capture paths may include a fixed exposure time and/or other exposure parameters to best detect strobing or flashing lights within a given scene. Another image capture path may have a freely adjustable exposure time (e.g., autoexposure capture) to best detect other elements from the given scene.

In an example embodiment, one common lens (or lens set) may be provided in the system. This may reduce the cost and size of the system (e.g., the lens may be the most expensive and bulky element of the camera system). Such a single lens or lens set may also eliminate parallax error, as all image sensors receive and record image of the scene captured by a single lens, from a single point of view. One or more of the image sensors (recording a strongly attenuated view of the scene) may be able to use a long exposure time, allowing it to capture short-lived events in the scene (e.g., rapid pulses of light from raster-scanned or pulse-modulated LED signs and indicators) that may be missed by capture systems that employ short exposure times in order to produce an otherwise "correct" exposure of the scene (e.g., using exposure parameters based on an average or sampled photon flux of the scene).

The systems and methods described herein may provide extended dynamic range imaging for scenes with regions having widely different photon flux levels and/or scenarios in which light sources in the scene provide pulsed or otherwise changing photon fluxes. Such systems and methods may be configured to capture more faithful reproductions of a given scene and/or provide more certain information about the time-varying light sources as compared to conventional imaging systems.

II. Example Systems

Figure 1:
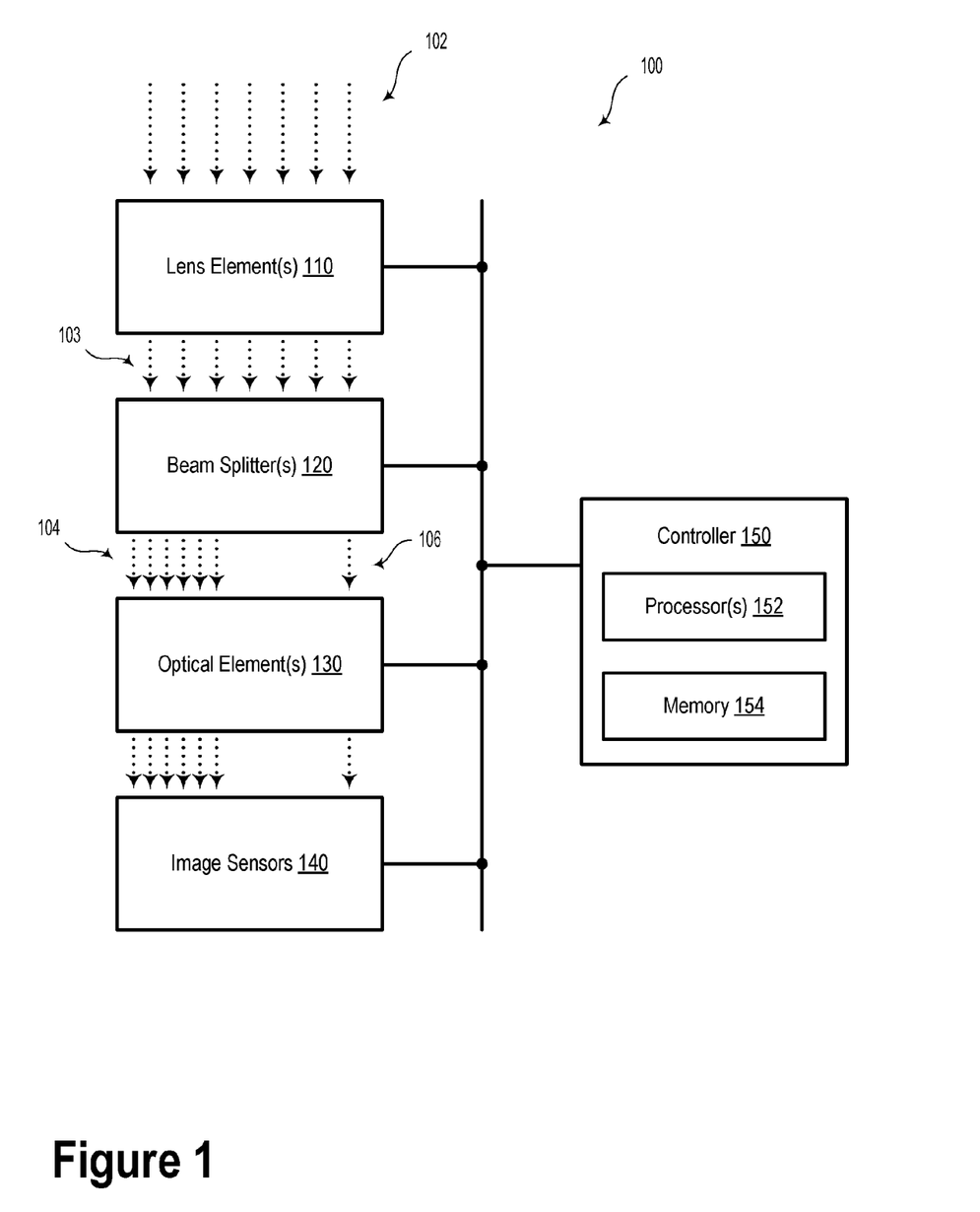
FIG. 1 illustrates a schematic diagram of an optical system, according to an example embodiment.

FIG. 1 illustrates a schematic diagram of an optical system 100, according to an example embodiment. Optical system 100 may include one or more lens elements 110, one or more beam splitters 120, and one or more optical elements 130. The optical system 100 also includes a plurality of image sensors 140 and a controller 150.

The optical system 100 may include a still camera, a video camera, a microscope, a telescope, or another device configured to capture image information from a scene. The optical system 100 may include a stand-alone device (e.g., a hand-held camera). Alternatively, the optical system 100 may be incorporated into (or may identified as) another system (e.g., a sensor system of an autonomous vehicle).

The optical system 100 may have a field of view, which may be defined by lens elements 110 and/or an aperture. The optical system 100 may receive incident light 102 from the field of view via the lens elements 110. The lens elements 110 may include a single lens, a lens doublet, a lens triplet, and/or more lens elements. The lens elements 110 may be interchangeable (e.g., single lens reflex (SLR)-type or rangefinder-type lenses). That is, various lenses or combinations of lenses may be switchably coupled to optical system 100 via an optical lens mount (e.g., Canon EF-S mount, Nikon F-mount). As such, optical system 100 may be configured to provide a wide range of fields of view having fixed or variable extents. The lens elements 110 may be capable of varying their optical parameters (e.g., focal length, field of view, aperture, focus setting, image stabilization, etc.) either manually or through remotely-controlled actuators.

It is understood that the field of view of optical system 100 may include many different types of scenes and/or subjects. In an example embodiment, a given scene may provide widely varying photon fluxes from different portions of the scene.

At least a portion of the incident light 103 may interact with one or more beam splitters 120. The one or more beam splitters 120 may include a beam splitting cube formed by two triangular glass prisms. However, other types of beam splitters are possible. For instance, the one or more beam splitters 120 may include a partially-silvered mirror or glass having an anti-reflection coating.

The one or more beam splitters 120 may separate the collected light 103 into a first portion 104 having a first photon flux and a second portion 106 having a second photon flux. The first portion of light 104 and the second portion of light 106 may have the same field of view. However, the first portion of light 104 may have a photon flux at least one order of magnitude greater than that of the second portion of light 106. For instance, the first portion of light 104 may have a photon flux amounting to 96% of the photon flux of collected light 103. Accordingly, the second portion of light 106 may have a photon flux amounting to 4% of the photon flux of collected light 103. As such, in an example embodiment, the beam splitters 120 may effectively provide different amounts of neutral density optical attenuation to the incident light to provide the first portion of light 104 and the second portion of light 106.

In some embodiments, the one or more beam splitters 120 may include a dichroic optical element or a frequency selective surface. In such a scenario, the beam splitters 120 may be additionally or alternatively configured to provide the respective portions of light as having specific spectral components based on the dichroic optical element or frequency selected surface.

After interacting with the beam splitters 120, the respective first portion of light 104 and second portion of light 106 may optionally interact with further optical elements 130. In an example embodiment, optical elements 130 may include a polarization filter, a spectral filter, a spatial filter, a lens, a lens set, or a neutral density filter. Other types of optical elements 130 are contemplated.

The plurality of image sensors 140 may include a first image sensor configured to receive the first portion of the incident light 104 and a second image sensor configured to receive the second portion of the incident light 106. The plurality of image sensors 140 may include, but are not limited to, a complementary metal-oxide-semiconductor (CMOS) image sensor, a charge-coupled device (CCD) image sensor, or another type of multi-element photodetector sensor (e.g., focal plane array). Furthermore, while embodiments herein describe image capture scenarios in the visible light spectrum, similar optical systems are contemplated that may receive and capture other wavelengths or wavebands of light. For example, optical system 100 may be configured to operate in the near-infrared wavelength range or another spectral range.

Controller 150 includes at least one processor 152 and a memory 154. The controller 150 is configured to execute instructions stored in the memory. The execution of the instructions may be performed to carry out a variety of operations such as causing the first image sensor to capture a first image of the first portion of the incident light 104 according to first exposure parameters. Furthermore, the operations may include causing the second image sensor to capture a second image of the second portion of the incident light 106 according to second exposure parameters.

The respective exposure parameters may include various settings the optical system 100 uses to capture the first image and the second image. For instance, the respective exposure parameters may include an image sensor sensitivity setting (e.g., ISO), an aperture setting (e.g., f-number), and an image capture time (e.g., shutter speed). Other types of exposure parameters are possible. In an example embodiment, the first exposure parameters may include a relatively short capture time (e.g., 1 millisecond) and the second exposure parameters may include a relatively long capture time (e.g., 100 milliseconds). That is, in some embodiments, a first exposure time used to capture the first image may be at least an order of magnitude shorter than the second exposure time used to capture the second image.

An extended dynamic range image may be formed based on the first image and the second image. That is, the first image and the second image may be combined or merged so as to form a composite image with effectively larger dynamic range with respect to the constituent images. In this regard, the combination and merging of images may be performed via a high-dynamic range (HDR) image processing. For example, the underexposed regions of the first image may be replaced or augmented with "properly" exposed information from the corresponding regions of the second image. Additionally or alternatively, the overexposed regions of the second image may be replaced or augmented with the "properly" exposed information from the corresponding regions of the first image. Other ways to combine the first and the second images to form the extended dynamic range image are possible.

Extended dynamic range images may provide more information about specific objects or features within a given scene. For example, in an autonomous vehicle context, the extended dynamic range images may provide more complete information about dim or a time-varying sources of light, such as a raster display (e.g., a cathode ray tube or interlaced video monitor) or a flashing display (e.g., an LED banner marquee or an LED traffic signal). Other types of temporally-varying light sources are contemplated herein.

In some embodiments, the one or more beam splitters 120 may be configured to separate the collected light 103 into more than two portions. That is, in an example embodiment, two optically-coupled beam splitters 120 may be configured to separate the collected light 103 into a first portion, a second portion, and a third portion of light. Similar to prior examples, the first portion of light could have at least an order of magnitude higher photon flux than the second portion of light, which could in turn have at least an order of magnitude higher photon flux than the third portion of light. Other relative levels of photon flux among the respective portions of light are possible and contemplated.

In such a scenario, the image sensors 140 may include a third image sensor configured to capture a third image. The third image may include the third portion of the incident light captured according to third exposure parameters. In an example embodiment, the third exposure parameters may include a longer capture time than the second exposure parameters. For example, the capture time for the third image may be 1 second. Other capture times and other exposure parameters are possible. Based on the first image, the second image, and the third image, a bracketed extended dynamic range image may be provided. The bracketed extended dynamic range image may provide image information over a larger dynamic range than would otherwise be possible with just one image sensor capturing a given scene with a given set of exposure parameters.

Optionally, the various image sensors 140 may be identical (except for the portion of incident light they receive). Alternatively, the image sensors 140 may each have different properties than the other image sensors. For example, a given image sensor from the plurality of image sensors 140 may have a different spectral response, a different spatial resolution, or a different readout rate than the other image sensors. Other types of distinctions are possible between the various image sensors 140.

Figure 2A:
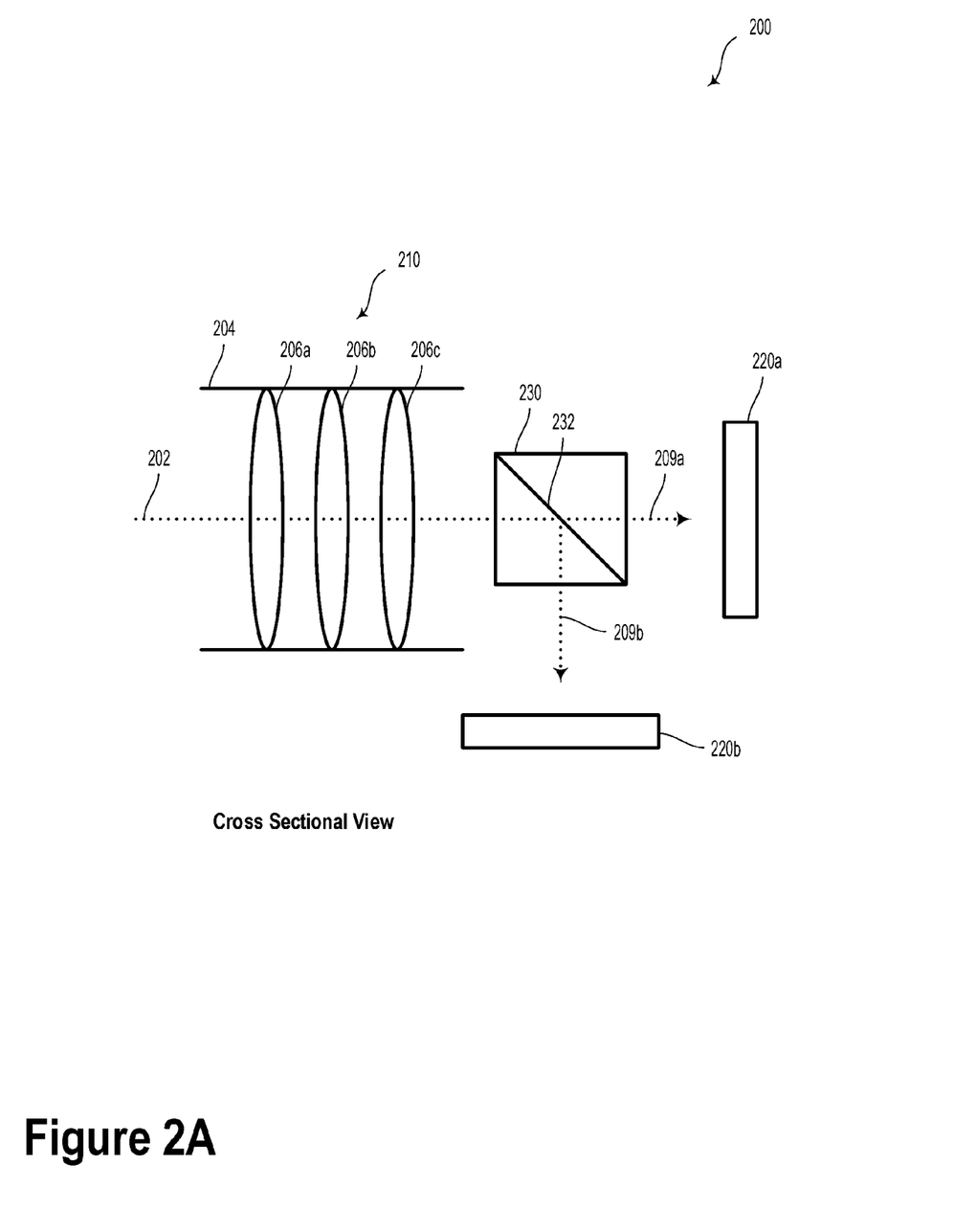
FIG. 2A illustrates an optical system, according to an example embodiment.
Figure 2B:
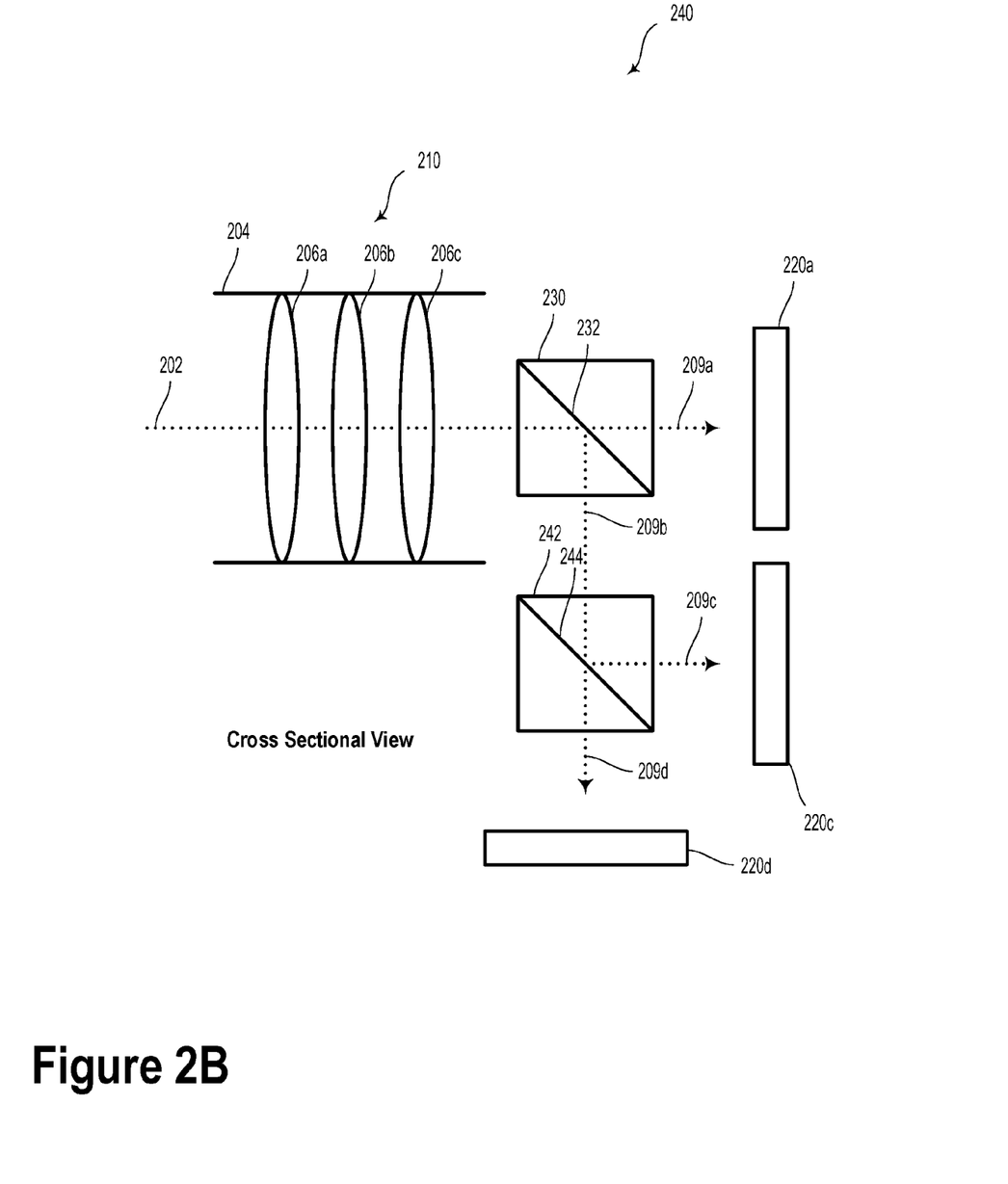
FIG. 2B illustrates an optical system, according to an example embodiment.
Figure 2C:
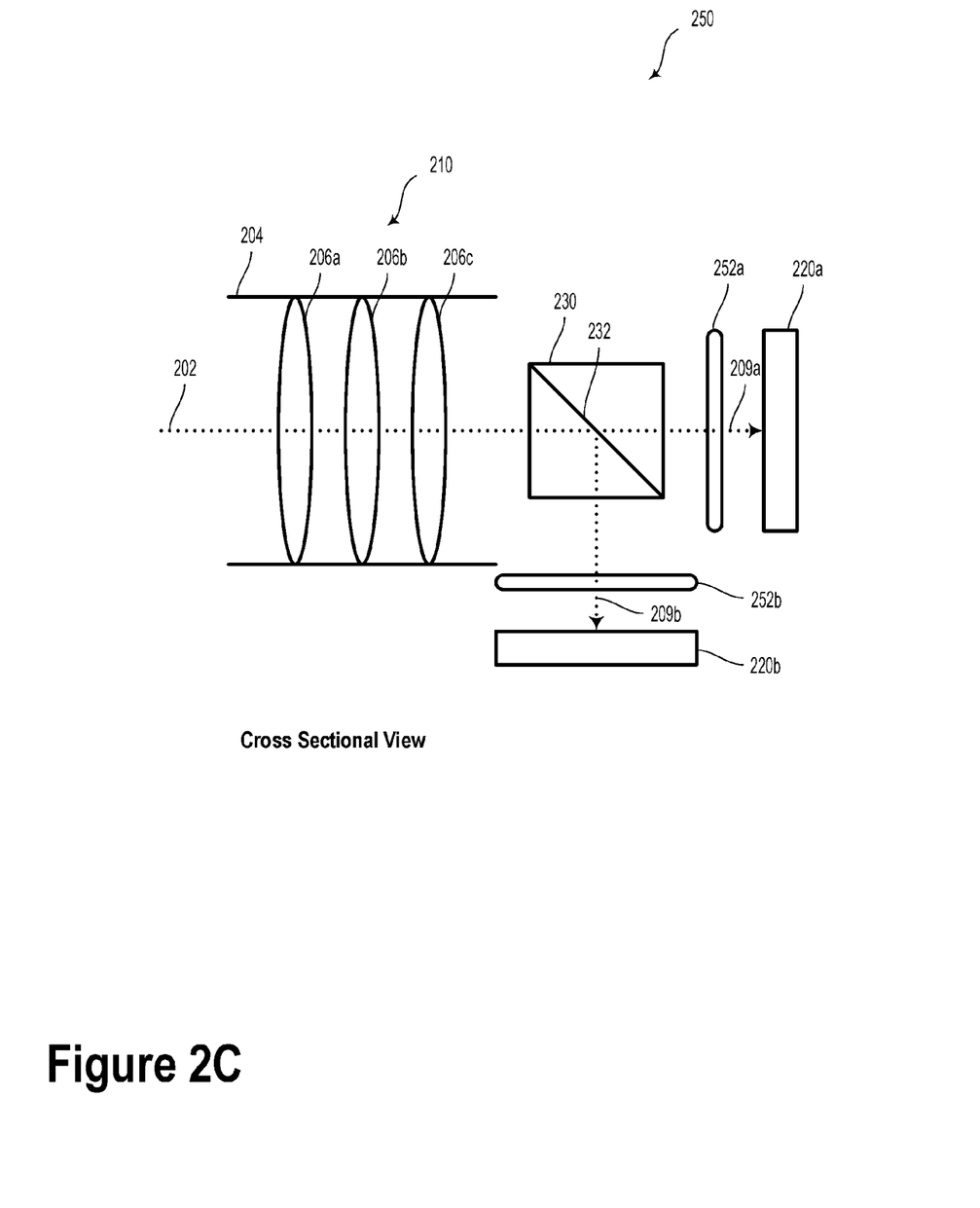
FIG. 2C illustrates an optical system, according to an example embodiment.

FIGS. 2A through 2C illustrate some non-limiting examples of optical systems contemplated in the present disclosure. FIG. 2A illustrates an optical system 200, according to an example embodiment. Optical system 200 may include elements that are similar or identical to corresponding elements of optical system 100 described with regard to FIG. 1. Optical system 200 includes a lens element 210, which may include a lens body 204 and one or more lenses 206a-c. In an embodiment, the lens element 210 may include an interchangeable lens (e.g., an SLR lens) or another type of lens that may be removably coupled to the other elements of optical system 200. The optical system 200 also includes a beam splitter 230, which could be a beam cube or another type of optical beam splitter as described herein. In an embodiment, the beam splitter 230 may include a beam splitting surface 232 configured to separate the incident light 202 into a first portion 209a and a second portion 209b. In an example embodiment, the first portion 209a may include a much larger photon flux than that of the second portion 209b. For instance, the first portion 209a may have a photon flux that is at least an order of magnitude larger than the photon flux of the second portion 209b. Put another way, the second portion 209b may include light from the field of view of the lens element 210 that is attenuated.

The optical system 200 includes a first image sensor 220a configured to receive the first portion of light 209a and a second image sensor 220b configured to receive the second portion of light 209b. The respective image sensors 220a and 220b may be similar or identical image sensors that are configured to capture the respective portions of light according to respective exposure parameters. In an example embodiment, the first image may be captured by the first image sensor 220a according to first exposure parameters, which may include a sensitivity and/or gain setting or a capture time (e.g., an exposure time or shutter time). For instance, the capture time for the first image may be 1 millisecond.

Similarly, the second image may be captured by the second image sensor 220b according to second exposure parameters. In such a scenario, if the photon flux of the second portion of light 209b is approximately an order of magnitude less than that of the first portion of light 209a, the capture time for the second image may be 10 milliseconds. Other capture times are possible. Furthermore, the respective capture times and other exposure parameters may be determined based on prior images of the scene and/or information from a light meter measurement.

FIG. 2B illustrates an optical system 240, according to an example embodiment. The optical system 240 may include similar or identical elements to corresponding elements of optical systems 100 and 200 illustrated and described with regard to FIGS. 1 and 2A. The optical system 240 includes a lens element 210 and a beam splitter 230. Furthermore, the optical system 240 may include a further beam splitter 242, which has a beam splitting surface 244. In such a scenario, the further beam splitter 242 may be configured to separate incident light 209b into a second portion of light 209d and a further third portion of light 209c. The third portion of light 209c may have a photon flux that is at least an order of magnitude less than that of the second portion of light 209d. Yet further, the optical system 240 may include a second image sensor 220d and a third image sensor 220c. The second image sensor 220d may be configured to capture a second image based on the second portion of light 209d. The third image sensor 220c may be configured to capture a third image based on the third portion of light 209c. The third image may be captured according to third exposure parameters. For example, the third exposure parameters may include a capture time of 100 milliseconds. However, other capture times are possible.

FIG. 2C illustrates an optical system 250, according to an example embodiment. Optical system 250 may include elements similar or identical to corresponding elements of optical systems 100, 200, and 240 as illustrated and described with regard to FIGS. 1, 2A, and 2B. Furthermore, optical system 250 may include one or more further optical elements 252a and 252b. The further optical elements 252a and 252b may be arranged between the beam splitter 230 and the respective image sensors 220a and 220b. In an example embodiment, optical elements 252a and 252b may include an optical attenuator, a spatial filter, or a lens. The optical elements 252a and 252b may provide, for example, a conversion to different size image sensors or a different field of view (e.g., via conversion lens). In some example embodiments, the optical elements 252a and 252b could be controllably inserted and removed from the optical path. As such, the various optical elements 252a and 252b may be applied to the optical path based, for example, on imaging conditions (e.g., ambient lighting, average or sampled photon flux, etc).

Figure 3A:
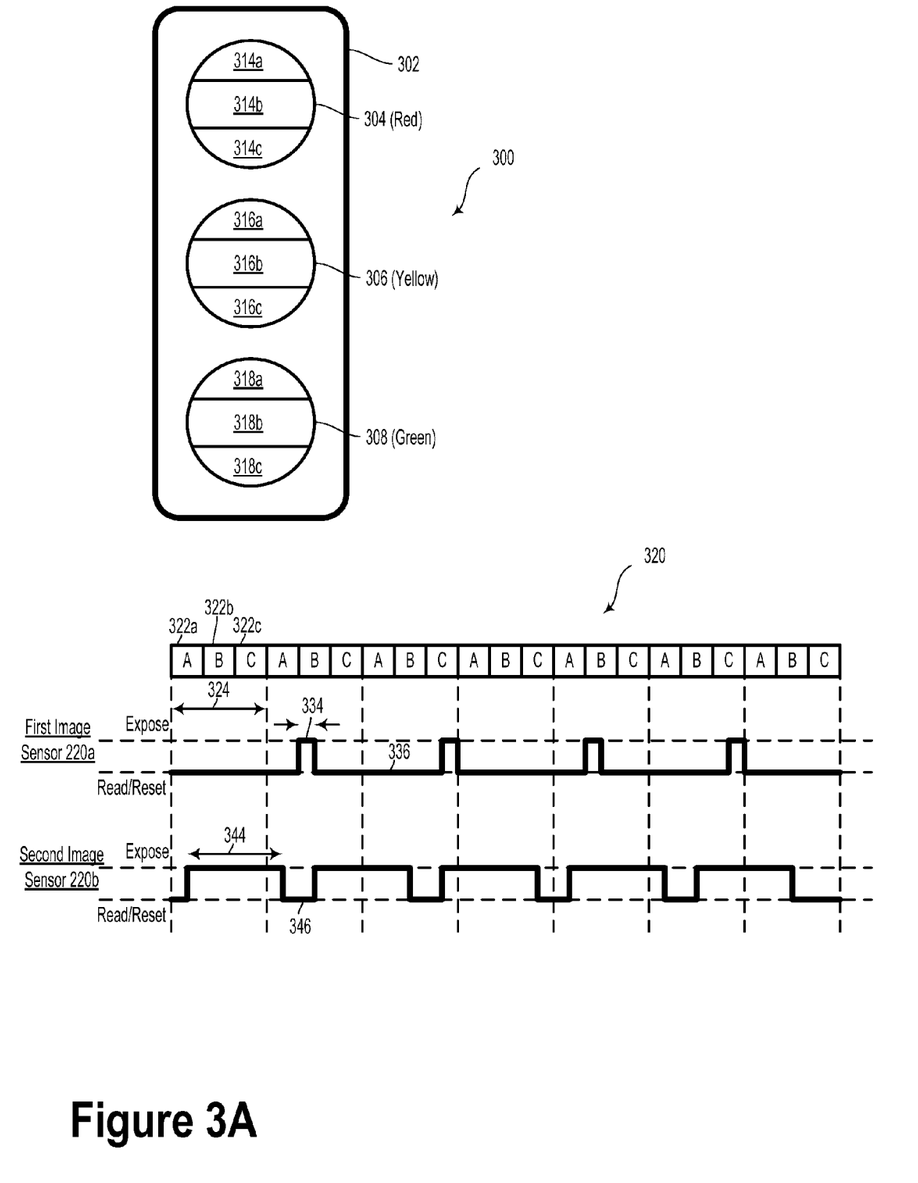
FIG. 3A illustrates a traffic light and an operational timing diagram, according to an example embodiment.

FIG. 3A illustrates a traffic light 300 and an operational timing diagram 320, according to an example embodiment. The traffic light 300 may include a housing 302 and a red light 304, a yellow light 306, and a green light 308. It is to be understood that other types of traffic signals or signage are contemplated herein.

The red light 304 may include a plurality of red light segments 314a-c, which may correspond to individual LED bulbs or sets of LED bulbs. Similarly, the yellow light 306 may include a plurality of yellow light segments 316a-c and the green light 308 may include a plurality of green light segments 318a-c. It is understood that for brevity, the described multi-segment light is simplified for clarity. Conventional traffic indicators may have more than 3 segments, which need not be arranged in horizontal strips. For example, some lights may include multiple segments that are arranged as vertical strips or pixels in an array.

The operational timing diagram 320 illustrates a simplified example of sequential operation of the traffic light 302. Namely, the traffic light 302 may illuminate light segments ending with "a" (e.g., red light segment 314a, yellow light segment 316a, or green light segment 318a) during a first time slot 322a. Furthermore, the traffic light 302 may illuminate light segments ending with "b" (e.g., red light segment 314b, yellow light segment 316b, or green light segment 318b) during a second time slot 322b. Yet further, the traffic light 302 may illuminate light segments ending with "c" (e.g., red light segment 314c, yellow light segment 316c, or green light segment 318c) during a third time slot 322c.

The first, second, and third time slots 322a-c may make up a time period 324 that may repeat. Furthermore, the green, yellow, and red lights may cycle according to a longer time period than that contemplated herein. In other words, during a "red" light period, the red light segments 314a-c may sequentially cycle on and off according to the operational timing diagram 320. That is, only one red light segment 314a-c would be illuminated at any one time over the period

324. In an example embodiment, for illustrative purposes, the respective time slots 322*a-c* may be 2 milliseconds, although other time slot periods are possible. Other types of sequential and non-continuous illumination operational modes are contemplated herein.

In an example embodiment, the first image sensor (e.g., image sensor 220*a*) may receive a first portion of light having a photon flux of approximately 91% of the total incident light flux. In such a scenario, the first image sensor may be controlled to capture a first image over a relatively short capture time 334 (e.g., 1 millisecond). The first image sensor may further carry out read and reset functions during a read/reset period 336. However, due to the short capture time (e.g., 1 millisecond), the first image would only include information about two of the three light segments (at most).

A second image sensor (e.g. image sensor 220*b*) may receive a second portion of light having a photon flux of approximately 9% of the total incident light flux. Accordingly, the second image sensor may be controlled to capture a second image over a relatively longer capture time 344 (e.g., 6 milliseconds), which may provide information about which light segments are illuminated in each of the time slots 322*a-c*. In some embodiments, the second image sensor may have a relatively shorter read/reset period 346 as compared to the first image sensor.

The operational timing diagram 320 described herein is for illustrative purposes only and a wide range of other possible light illumination sequences are possible. The present optical system and method may provide better imaging information for stop lights that utilize such a sequential or non-persistent lighting system. Other image capture applications involving temporally-dynamic light sources are contemplated.

Figure 3B:
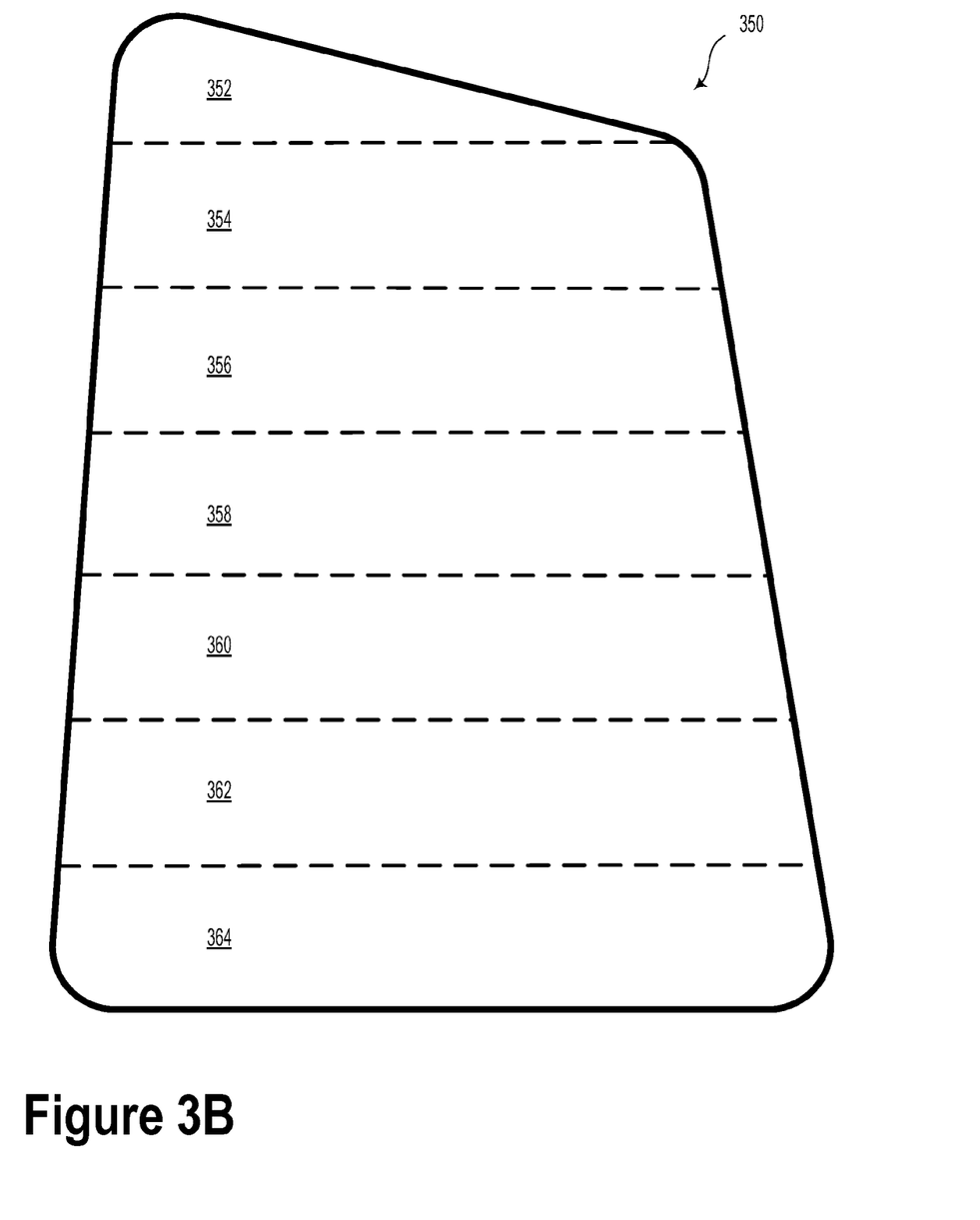
FIG. 3B illustrates a tail light, according to an example embodiment.

FIG. 3B illustrates a tail light 350, according to an example embodiment. The tail light 350 may be part of an autonomous vehicle or a standard vehicle. The tail light 350 may include a plurality of light segments 352-364. In an example embodiment, the plurality of light segments 352-364 may illuminate in a grouped, sequential manner. That is, during normal operation, the tail light 350 may illuminate in portions, during a plurality of sequential time slots. As an example, a first group of three light segments 352, 358, and 364 may illuminate during a first time slot, followed by a second group of two light segments 354 and 360 during a second time slot, followed by a third group of two light segments 356 and 362 during a third time slot. In some embodiments, the scenario may include the tail light 350 turning on and off (e.g., such as a turn indicator). Other types of light-emitting variations (e.g., temporal and spatial) are possible.

When imaging such a tail light 350, an optical system such as optical systems 100, 200, 240, and 250 may be configured to capture at least one image with an exposure condition having a capture time greater than the sum of the first, second, and third time slots. In such a scenario, the composite expanded dynamic range image includes more complete information about the possible illumination of tail light 350.

III. Example Methods

Figure 4:
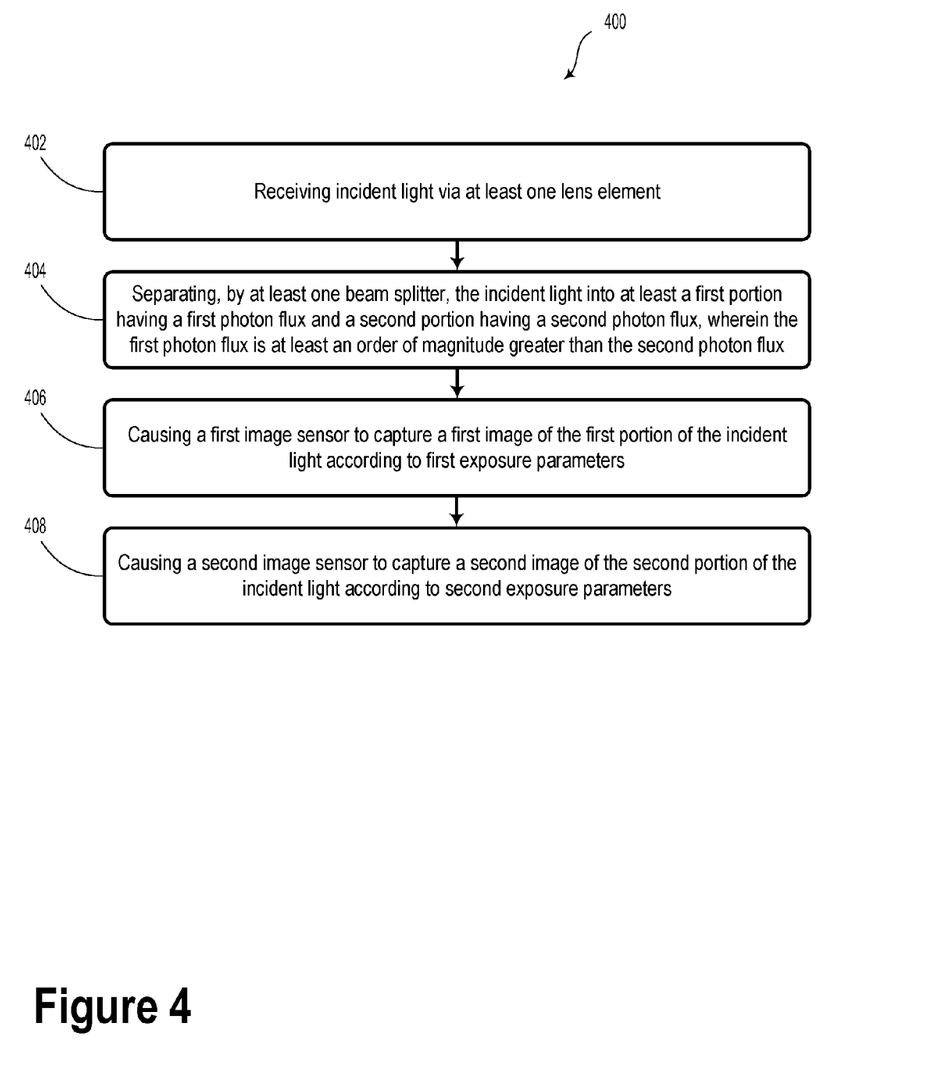
FIG. 4 illustrates a method, according to an example embodiment.

FIG. 4 illustrates a method 400, according to an example embodiment. The method 400 may include various blocks or steps. The blocks or steps may be carried out individually or in combination. The blocks or steps may be carried out in any order and/or in series or in parallel. Further, blocks or steps may be omitted from or added to method 400.

Some or all blocks of method 400 may involve elements of optical systems 100, 200, 240, or 250 as illustrated and described in reference to FIGS. 1, 2A, 2B, and 2C. Furthermore, some blocks of method 400 may involve causing one or more image sensors capture an image, as illustrated and described in reference to FIGS. 4A and 4B. Some or all blocks of method 400 may be carried out by controller 150 and/or processor 152 and memory 154.

Block 402 includes receiving incident light via at least one lens element of an optical system. In an example embodiment, the method may include receiving incident light 102 via lens elements 110 as illustrated and described with regard to FIG. 1. The incident light may include light emitted from a raster display or a flashing display. In an example embodiment, the raster display or the flashing display may include a traffic signal, a vehicle light, or indicator.

Block 404 includes separating, by at least one beam splitter, the incident light into at least a first portion having a first photon flux and a second portion having a second photon flux, wherein the first photon flux is at least an order of magnitude greater than the second photon flux. The at least one beam splitter may include a partially-silvered mirror or glass having an anti-reflection coating. In an example embodiment, the at least one beam splitter may include a dichroic optical element or a frequency selective surface.

In an example embodiment, at least one optical element may be arranged along an optical path between the at least one beam splitter and at least one of the first image sensor or the second image sensor. The at least one optical element may include a lens, an optical attenuator, a spatial filter, or a spectral filter.

Block 406 includes causing a first image sensor to capture a first image of the first portion of the incident light according to first exposure parameters.

Block 408 includes causing a second image sensor to capture a second image of the second portion of the incident light according to second exposure parameters. In an example embodiment, the first and second image sensor may include a multi-element photodetector array.

In an example embodiment, the first exposure parameters include a first exposure time and the second exposure parameters include a second exposure time. The first exposure time is at least an order of magnitude shorter than the second exposure time.

The first and second image may be combined and/or merged to provide a wider dynamic range image. For example, the method may optionally include determining an extended dynamic range image based on high-dynamic range (HDR) image processing of the first image and the second image.

In an example embodiment, the optical system may include a first beam splitter and a second beam splitter. The first beam splitter and the second beam splitter may be further configured to separate the incident light into a third portion having a third photon flux. In such a scenario, the second photon flux may be at least an order of magnitude greater than the third photon flux.

In such a scenario, the method may also include causing a third image sensor to capture a third image of the third portion of the incident light according to third exposure parameters. As such, the method may also include determining a bracketed extended dynamic range image based on the first image, the second image, and the third image.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. An optical system comprising:
   at least one lens element configured to receive incident light;
   at least one beam splitter optically coupled to the at least one lens element, wherein the at least one beam splitter is configured to separate the incident light into at least a first portion having a first photon flux and a second portion having a second photon flux, wherein the first photon flux is at least an order of magnitude greater than the second photon flux;
   a first image sensor configured to receive the first portion of the incident light;
   a second image sensor configured to receive the second portion of the incident light; and
   a controller comprising at least one processor and a memory, wherein the controller is configured to execute instructions stored in the memory so as to carry out operations, the operations comprising:
      causing the first image sensor to capture a first image of the first portion of the incident light according to first exposure parameters, wherein the first exposure parameters are predetermined based on a known periodic illumination time associated with a temporally-varying photon flux source; and
      causing the second image sensor to capture a second image of the second portion of the incident light according to second exposure parameters, wherein the second exposure parameters are related to the temporally-varying photon flux source, and wherein the second exposure parameters are adjustable based on a scene associated with the incident light.

2. The optical system of claim 1, wherein the operations of the controller further comprise determining an extended dynamic range image based on the first image and the second image.

3. The optical system of claim 1, wherein the at least one beam splitter comprises a partially-silvered mirror or glass having an anti-reflection coating.

4. The optical system of claim 1, wherein the at least one beam splitter comprises a dichroic optical element or a frequency selective surface.

5. The optical system of claim 1, wherein the temporally-varying photon flux source comprises two or more light segments, wherein the second exposure parameters are based on operation of the two or more light segments, and wherein operation of the two or more light segments comprises illuminating at least two of the two or more light segments at different times within a known time frame of the temporally-varying photon flux source, and wherein the incident light comprises light emitted from the temporally-varying photon flux source.

6. The optical system of claim 5, wherein the temporally-varying photon flux source comprises a raster display or a flashing display, and wherein the raster display or the flashing display comprises a traffic signal or an automotive indicator.

7. The optical system of claim 1, further comprising at least one optical element, wherein the at least one optical element is arranged along an optical path between the at least one beam splitter and at least one of the first image sensor or the second image sensor, wherein the at least one optical element comprises at least one of: an optical attenuator, a spatial filter, or a lens.

8. The optical system of claim 1, wherein the first exposure parameters comprises a first exposure time and the second exposure parameters comprise a second exposure time, wherein the first exposure time is at least an order of magnitude shorter than the second exposure time.

9. The optical system of claim 1, wherein the at least one beam splitter comprises a first beam splitter and a second beam splitter, wherein the at least one beam splitter is further configured to separate the incident light into a third portion having a third photon flux, wherein the second photon flux is at least an order of magnitude greater than the third photon flux.

10. The optical system of claim 9, further comprising a third image sensor, wherein the operations further comprise:
    causing the third image sensor to capture a third image of the third portion of the incident light according to third exposure parameters; and
    determining a bracketed extended dynamic range image based on the first image, the second image, and the third image;
    wherein at least one of the first image sensor, the second image sensor, or the third image sensor has at least one of: a different spectral response, a different spatial resolution, or a different readout rate with respect to the other image sensors.

11. A method comprising:
    receiving incident light via at least one lens element;
    separating, by at least one beam splitter, the incident light into at least a first portion having a first photon flux and a second portion having a second photon flux, wherein the first photon flux is at least an order of magnitude greater than the second photon flux;

causing a first image sensor to capture a first image of the first portion of the incident light according to first exposure parameters, wherein the first exposure parameters are predetermined based on a known periodic illumination time associated with a temporally-varying photon flux source; and causing a second image sensor to capture a second image of the second portion of the incident light according to second exposure parameters, wherein the second exposure parameters are related to the temporally-varying photon flux source, and wherein the second exposure parameters are adjustable based on a scene associated with the incident light.

12. The method of claim 11, further comprising determining an extended dynamic range image based on the first image and the second image.

13. The method of claim 11, wherein the temporally-varying photon flux source comprises a raster display or a flashing display, wherein the raster display or the flashing display comprises a traffic signal, wherein the first exposure parameters and the second exposure parameters differ based on operation of two or more light segments of the traffic light, and wherein operation of the two or more light segments comprises illuminating at least two of the two or more light segments at different times within a known frame time of the traffic signal.

14. The method of claim 11, wherein the first exposure parameters comprises a first exposure time and the second exposure parameters comprise a second exposure time, wherein the first exposure time is at least an order of magnitude shorter than the second exposure time.

15. The method of claim 11, wherein the at least one beam splitter comprises a first beam splitter and a second beam splitter, wherein separating the incident light further comprises separating the incident light into a third portion having a third photon flux, wherein the second photon flux is at least an order of magnitude greater than the third photon flux.

16. The method of claim 15, further comprising:
causing the third image sensor to capture a third image of the third portion of the incident light according to third exposure parameters; and
determining a bracketed extended dynamic range image based on the first image, the second image, and the third image.

17. The optical system of claim 1, wherein the first exposure parameters and the second exposure parameters differ based on operation of two or more light segments comprised within the temporally-varying photon flux source.

18. The optical system of claim 1, wherein the second exposure parameters are based on a prior image of a scene associated with the incident light.

19. A method comprising:
receiving incident light via at least one lens element;
separating, by at least one beam splitter, the incident light into at least a first portion having a first photon flux and a second portion having a second photon flux, wherein the first photon flux is at least an order of magnitude greater than the second photon flux;
causing a first image sensor to capture a first image of the first portion of the incident light according to first exposure parameters, wherein the first exposure parameters are based on a known first periodic illumination time associated with one light segment of two or more light segments of a temporally-varying photon flux source; and
causing a second image sensor to capture a second image of the second portion of the incident light according to second exposure parameters, wherein the second exposure parameters are related to the temporally-varying photon flux source, and wherein the second exposure parameters are based on a known second periodic illumination time associated with at least two of the two or more light segments of the temporally-varying photon flux source.

* * * * *